US012594584B2

(12) United States Patent
Guan

(10) Patent No.: US 12,594,584 B2
(45) Date of Patent: Apr. 7, 2026

(54) MULTI-DIRECTIONAL SPRAYING DEVICE AND USE METHOD THEREOF

(71) Applicant: Taizhou Didu Environmental Protection Technology Co., Ltd, Taizhou (CN)

(72) Inventor: Lihong Guan, Taizhou (CN)

(73) Assignee: Taizhou Didu Environmental Protection Technology Co., Ltd., Taizhou (CN)

( * ) Notice: Subject to any disclaimer, the term of this patent is extended or adjusted under 35 U.S.C. 154(b) by 47 days.

(21) Appl. No.: 18/512,067

(22) Filed: Nov. 17, 2023

(65) Prior Publication Data

US 2025/0161994 A1 May 22, 2025

(51) Int. Cl.

*B08B 3/02* (2006.01)
*B08B 1/12* (2024.01)
*B08B 1/30* (2024.01)

(52) U.S. Cl.

CPC ................ *B08B 3/024* (2013.01); *B08B 1/12* (2024.01); *B08B 1/30* (2024.01); *B08B 3/02* (2013.01)

(58) Field of Classification Search

None

See application file for complete search history.

(56) References Cited

U.S. PATENT DOCUMENTS

2003/0066158 A1* 4/2003 Porter ................. A47L 11/4094 15/385
2008/0053495 A1* 3/2008 Franks ...................... B08B 3/02 134/198
2012/0097201 A1* 4/2012 Field ....................... A61L 2/186 134/58 R
2022/0110497 A1* 4/2022 Rieben ................ A47L 11/4044

FOREIGN PATENT DOCUMENTS

DE 202011107459 * 11/2011

OTHER PUBLICATIONS

Translation of DE202011107459 by Suttner, published Nov. 25, 2011.*

* cited by examiner

*Primary Examiner* — Kaj K Olsen
*Assistant Examiner* — Ryan L Coleman
(74) *Attorney, Agent, or Firm* — Jose Cherson Weissbrot

(57) ABSTRACT

The present invention relates to a multi-directional spraying device and a use method thereof. The spraying device comprises a frame component, a spraying component and a moving component, wherein the spraying component comprises a first spraying mechanism and a second spraying mechanism and is detachably connected to the frame component; the first spraying mechanism and the second spraying mechanism are both provided with at least one movable nozzle; the valve component is communicated with the first spraying mechanism and the second spraying mechanism;

(Continued)

the moving component is fixedly connected with the frame component to support and move the frame component; and when in use, the multi-directional spraying device is communicated with the outside.

10 Claims, 23 Drawing Sheets

MULTI-DIRECTIONAL SPRAYING DEVICE AND USE METHOD THEREOF

TECHNICAL FIELD

The present invention relates to the technical field of spraying devices, in particular to a multi-directional spraying device and a use method thereof.

BACKGROUND

Most spraying devices on the market can be used to clean the floor and the bottom of the car tray at the same time; the spraying device comprises a movable disk, bristles connected with the movable disk, wheels rotatably connected with the movable disk and nozzles arranged at the bottom of the movable disk. This kind of spraying device can be used to clean the ground everyday, but if you want to use this device to clean the bottom of the car tray, the direction of the nozzle is limited and you can't clean the bottom of the car tray, which leads to a single spraying direction of the spraying device.

Based on this, it is necessary to provide a brand-new spraying device, which has a novel structure, can spray water while connecting water pipes, and can realize washing the bottoms of various equipment and automobile chassis in multiple directions upwards, and can also wash the ground downwards, quickly clean dirt and spray water at the same time.

SUMMARY

The present invention provides a multi-directional spraying device, comprising a frame component, a spraying component and a moving component; and wherein, the frame component comprises a supporting end, and the supporting end comprises a first wall and a second wall opposite to the first wall, wherein there is a thickness dimension between the first wall and the second wall; and wherein, the spraying component is detachably attached to the supporting end and comprises a first spraying mechanism and a second spraying mechanism, wherein at least one movable nozzle is arranged on both the first spraying mechanism and the second spraying mechanism; wherein the spraying component further comprises a valve component communicating with the first spraying mechanism and the second spraying mechanism, and a water flow channel communicating with a plurality of nozzles;

wherein, the first spraying mechanism is arranged on the first wall, the second spraying mechanism is arranged on the second wall; and wherein, the moving component forms a fixed connection with the frame component to support and move the frame component.

The present invention further provides a multi-directional spraying device, comprising a frame component, a spraying component and a moving component; and wherein, the frame component comprises a supporting end, and the supporting end comprises a first wall and a second wall opposite to the first wall, wherein there is a thickness dimension between the first wall and the second wall;

wherein, the spraying component is detachably attached to the supporting end and comprises a first spraying mechanism and a second spraying mechanism, wherein at least one movable nozzle is arranged on both the first spraying mechanism and the second spraying mechanism, and the spraying component further comprises a valve component communicating with the first spraying mechanism and the second spraying mechanism, and a water flow channel communicating with a plurality of nozzles;

wherein, the first spraying mechanism is arranged on the first wall, and the second spraying mechanism is arranged on the second wall;

wherein, the spraying component comprises a rotating member, and the second spraying mechanism is rotatably attached to the valve component through the rotating member, wherein the water jet direction of the second spraying mechanism faces the ground; and wherein, the moving component forms a fixed connection with the frame component to support and move the frame component.

The present invention further provides a use method of a multi-directional spraying device, comprising providing a multi-directional spraying device, wherein the multi-directional spraying device comprises a frame component, a spraying component 2000 and a moving component;

wherein, the frame component comprises a supporting end, and the supporting end comprises a first wall 1002 and a second wall opposite to the first wall, wherein a there is a thickness dimension between the first wall and the second wall 1003; and wherein, the spraying component is detachably attached to the supporting end and comprises a first spraying mechanism and a second spraying mechanism, wherein at least one movable nozzle is arranged on both the first spraying mechanism and the second spraying mechanism, and the spraying component further comprises a valve component communicating with the first spraying mechanism and the second spraying mechanism, and a water flow channel communicating with a plurality of nozzles; wherein, the first spraying mechanism is arranged on the first wall, and the second spraying mechanism is arranged on the second wall;

wherein, the moving component forms a fixed connection with the frame component to support and move the frame component;

the method comprises, connecting the multi-directional spraying device with an external water source;

moving the multi-directional spraying device to a site where spraying operation is needed;

adjusting the valve component to enable the spraying component to perform spraying operation, wherein the valve component can control the spraying operation of the first spraying mechanism and the second spraying mechanism;

turning off the external water source after spraying operation is completed;

and recycling and cleaning the multi-directional spraying device.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
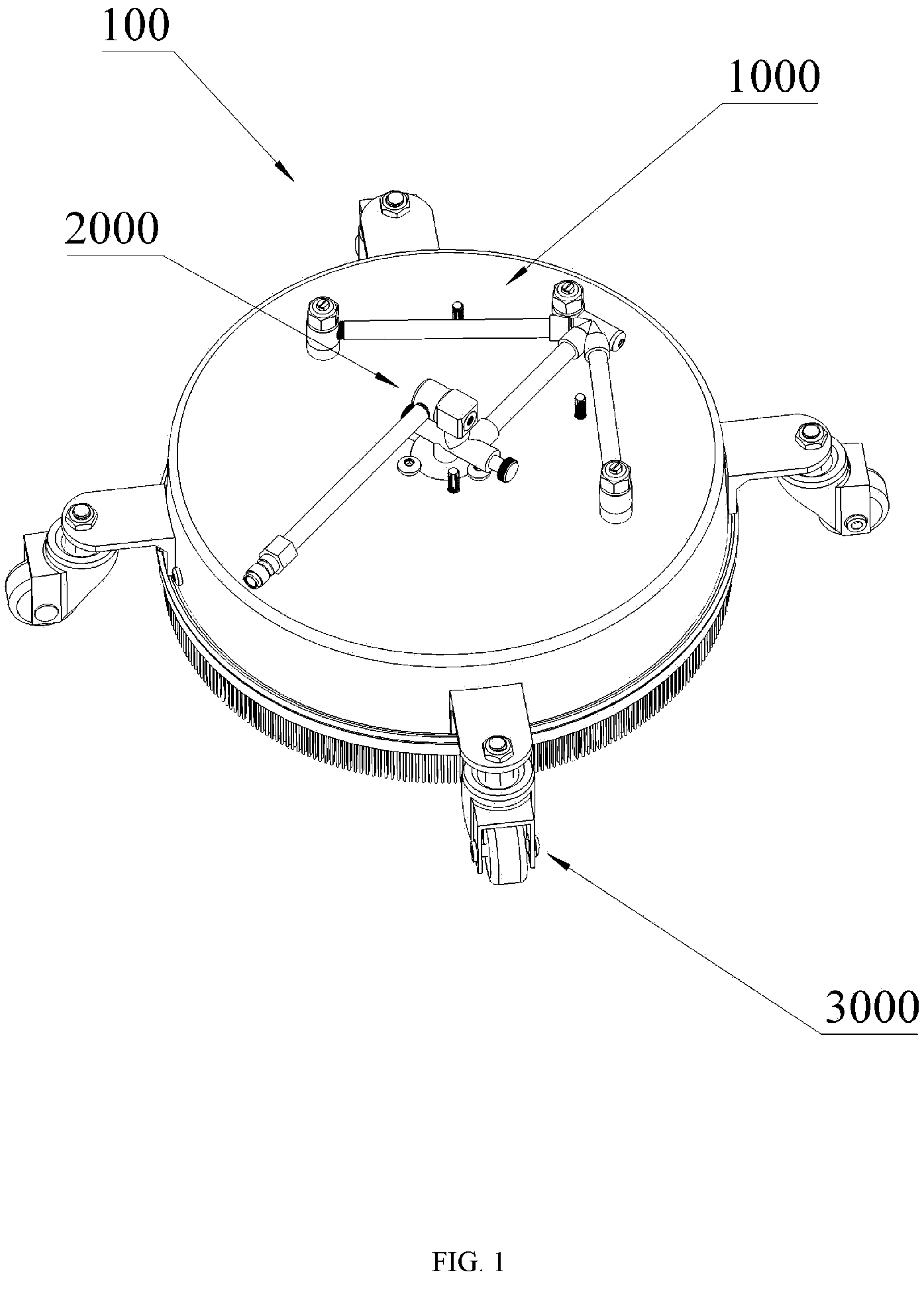
FIG. 1 is a schematic structural diagram of a multidirectional spraying device.

100, Multi-directional spraying device; 1000, Frame component; 1001, Supporting end; 1002, First wall; 1003, Second wall; 1004, Fixing seat; 1005, Connecting frame; 1006, Bristles; 1007, Casing; 1008, Through hole; 2000, Spraying component; 2001, First spraying mechanism; 2101, First nozzle; 2102, Second nozzle; 2103, Third nozzle; 2104, First water pipe; 2105, Second water pipe; 2106, Third water pipe; 2002, Second spraying mechanism; 2201, Fourth water pipe; 2202, Second internal thread; 2203, Fourth nozzle; 2204, Fifth nozzle; 2205, Sealing member; 2206, Sixth nozzle; 2207, Seventh nozzle; 2003, Nozzle; 2004, Water supply device; 2005, Water supply pipeline; 2006, Water inlet connector; 2007, Water outlet connector; 2008, Spray gun; 2009, Adapter; 2010, Connecting member; 2301, Bolts; 2302, Gasket; 2011, Fixing member; 2012, Fixing hole; 2013, Connecting part; 2014, Cavity; 2015, Fixing cover; 2016, First connecting end; 2017, Second connecting end; 2018, First external thread; 2019, Water flow path; 2020, Rotating member; 2021, Rotating part; 2022, Communicating part; 2023, Through groove; 2024, Second external thread; 2025, Balls; 2026, Water pipe; 3000, Moving component; 3001, Moving wheel; 4000, Valve component; 4001, Valve body; 4002, Piston device; 4003, Water inlet end; 4004, Water outlet end; 4101, First water outlet port; 4102, Second water outlet port; 4103, First internal thread; 4104, Water hole; 4005, Pin rod; 4006, Bolt cap; 4007, Sealing ring.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that people having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the present invention, the present invention provides a multi-directional spraying device 100, as shown in FIG. 1, which includes a frame component 1000, a spraying component 2000 and a moving component 3000.

Figure 2A:
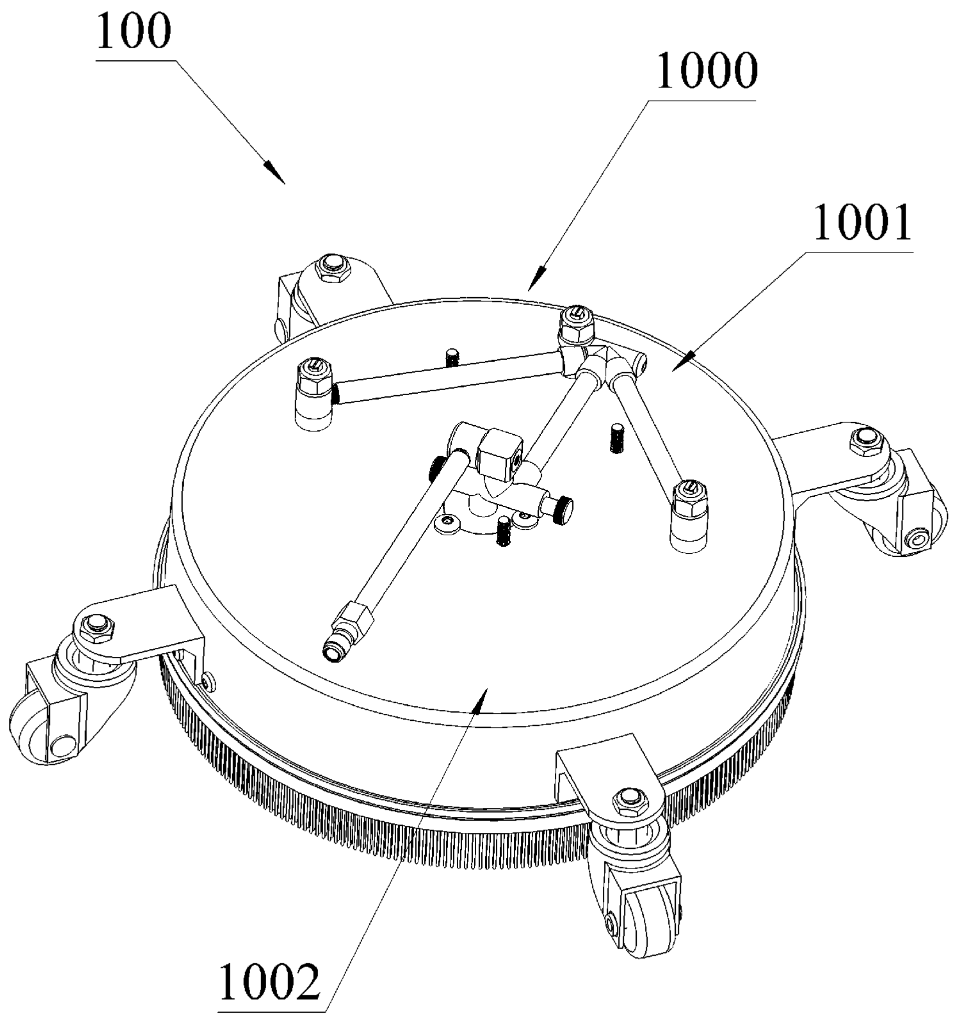
FIGS. 2A-2B are schematic structural views of the frame component.
Figure 2B:
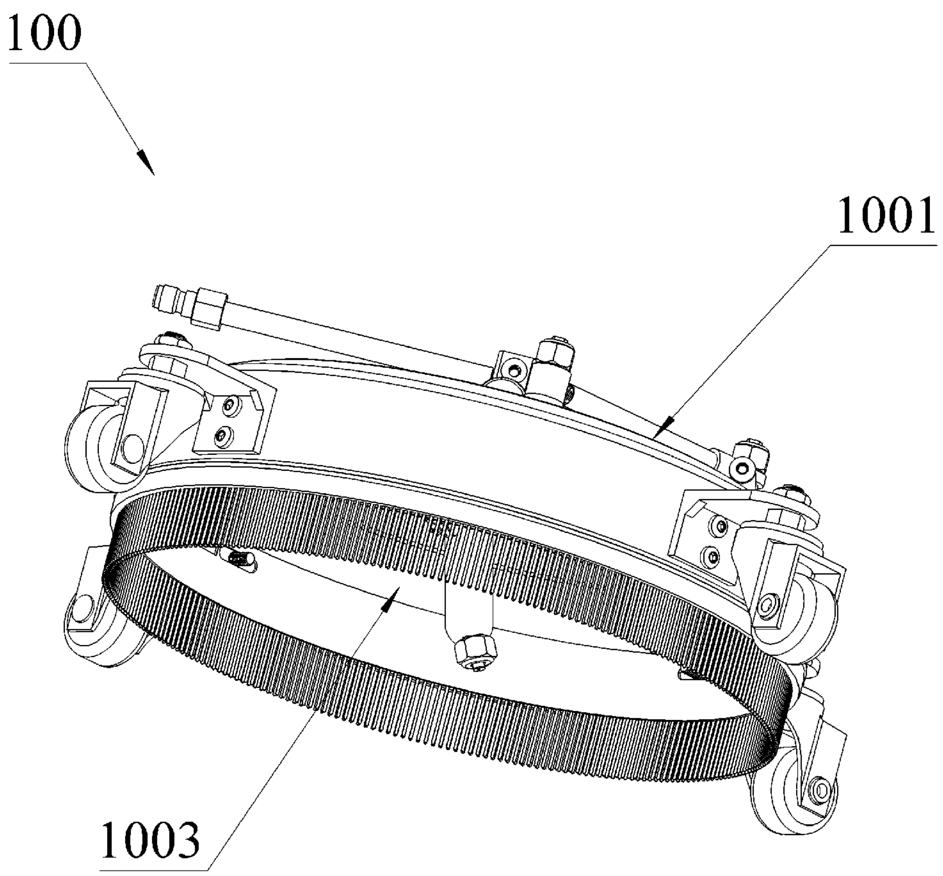

In this embodiment, as shown in FIGS. 2A-2B, the frame component 1000 includes a supporting end 1001, which includes a first wall 1002 and a second wall 1003 opposite to the first wall 1002, wherein there is a thickness dimension between the first wall 1002 and the second wall 1003.

Figure 3:
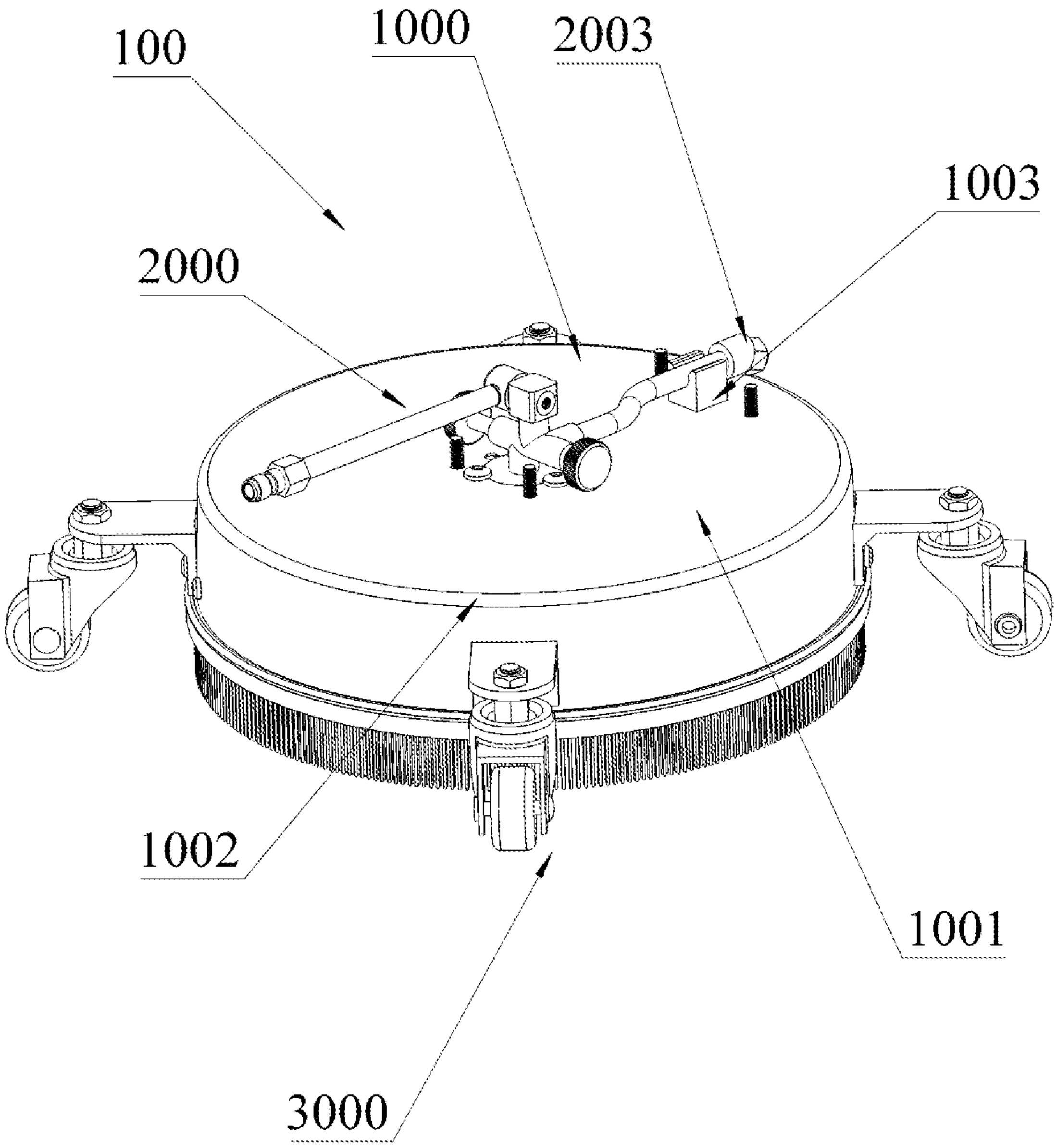
FIG. 3 is a structural schematic diagram of another embodiment.

As another preferred embodiment of the present invention, a lateral spraying device 100 is provided, as shown in FIG. 3, which includes a frame component 1000, a spraying component 2000 and a moving component 3000. The frame component 1000 includes a supporting end 1001, and the supporting end 1001 includes a first wall 1002 and a second wall 1003 opposite to the first wall 1002, wherein the first wall 1002 and the second wall 10000. The first wall 1002 is provided with a fixing seat 1004, which receives and fixes the first spraying mechanism 2001. The fixing seat 1004 fixes the first spraying mechanism 2001 on the first wall 1002, which ensures the stability in the spraying process, is convenient for disassembling and installation, and is convenient for later maintenance and replacement. In addition, the fixing seat 1004 can prevent the first spraying mechanism 2001 from being damaged during use.

Figure 4A:
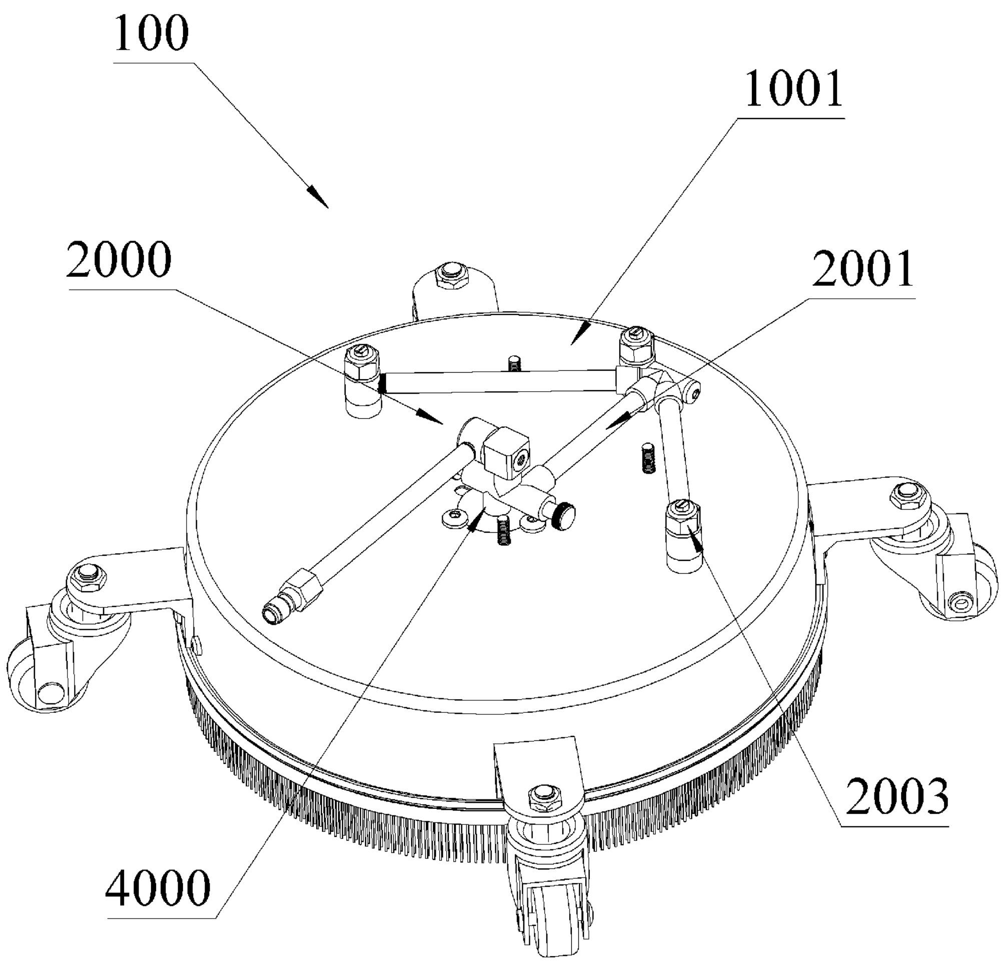
FIGS. 4A-4B are schematic diagrams of the connection structure between the spraying component and the frame component.
Figure 4B:
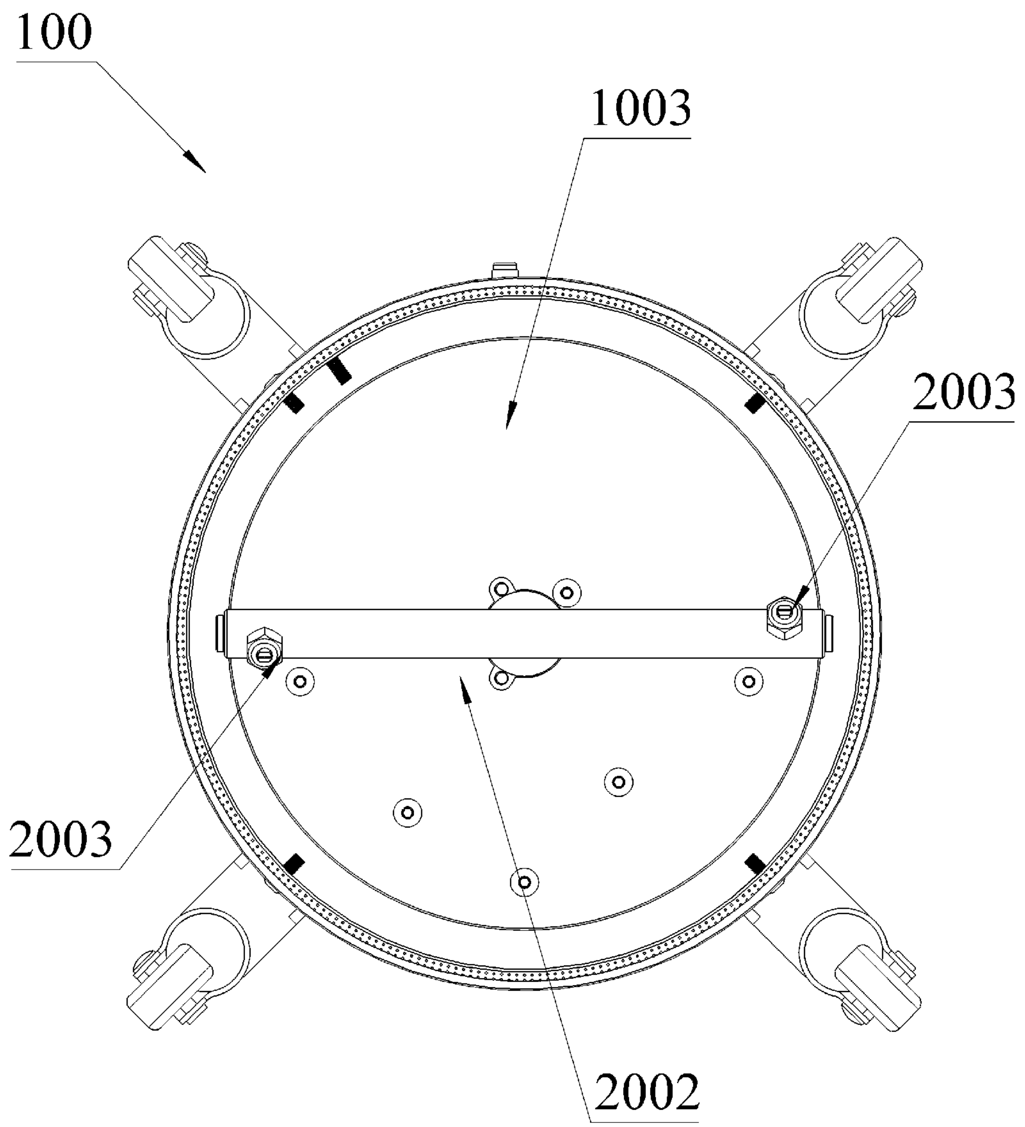

In this embodiment, as shown in FIGS. 4A-4B, the spraying component 2000 is detachably attached to the supporting end 1001, and incudes a first spraying mechanism 2001 and a second spraying mechanism 2002, wherein both the first spraying mechanism 2001 and the second spraying mechanism 2002 are provided with at least one movable nozzle 2003, wherein, the spraying component 2000 further includes a valve component 4000 communicating a first spraying mechanism 2001 and a second spraying mechanism 2002, and a water flow channel communicating a plurality of nozzles 2003, wherein the first spraying mechanism 2001 is arranged on the first wall 1002 and the second spraying mechanism 2002 is arranged on the second wall 1003.

In this embodiment, the moving component 3000 forms a fixed connection with the frame component 1000 to support and move the frame component 1000.

In other embodiments, the spraying direction of the first spraying mechanism 2001 faces the side of the spraying device, and a damping rubber ring is arranged in the nozzle 2003, through which the spraying direction of the nozzle 2003 can be adjusted. At the same time, the damping rubber ring can reduce the vibration generated by the nozzle 2003 during work, so that the spraying operation is more stable, and it plays a buffering role for the spraying device to prevent the spraying device from being damaged due to the excessive rotation of the nozzle 2003 during work.

Figure 5:
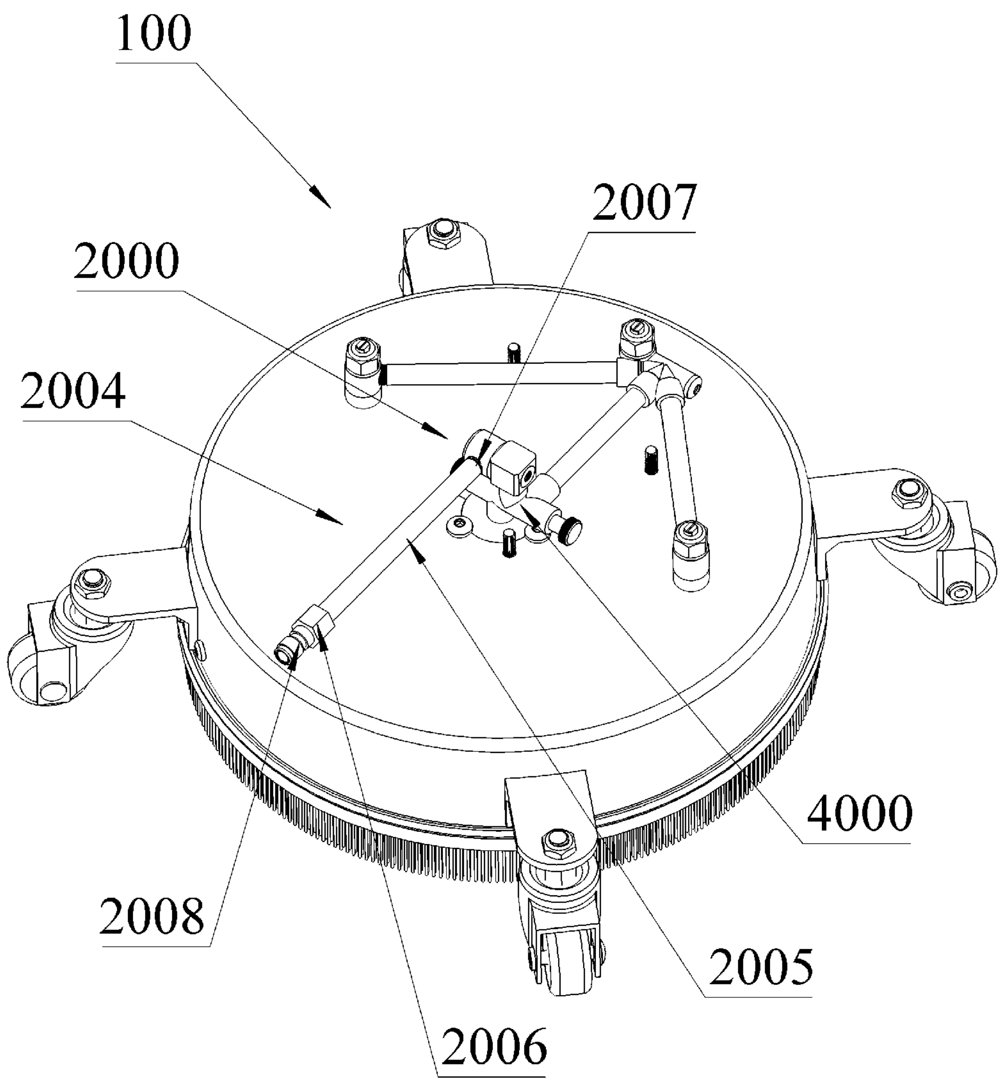
FIG. 5 is a schematic sectional view of the water supply device.

In this embodiment, as shown in FIG. 5, the spraying component 2000 further includes a water supply device 2004 detachably attached to the valve component 4000, wherein the water supply device 2004 includes a water supply pipe 2005, a water inlet connector 2006 and a water outlet connector 2007, and the water inlet connector 2006 is connected with an external water source, wherein the water supply pipe 2005 is made of stainless steel. In other embodiments (not shown in the figure), the water supply head can also be made of plastic.

In this embodiment, the water inlet connector 2006 is also connected with a spray gun 2008, wherein the nozzle of the spray gun 2008 is horizontally outward, and the spray gun 2008 can not only realize the water spraying function, but also be used for connecting a water pipe, thereby realizing a larger spraying range.

In other embodiments (not shown in the figure), the nozzle direction of the spray gun 2008 can be set horizontally upward, so as to realize the upward spraying operation.

Figure 6:
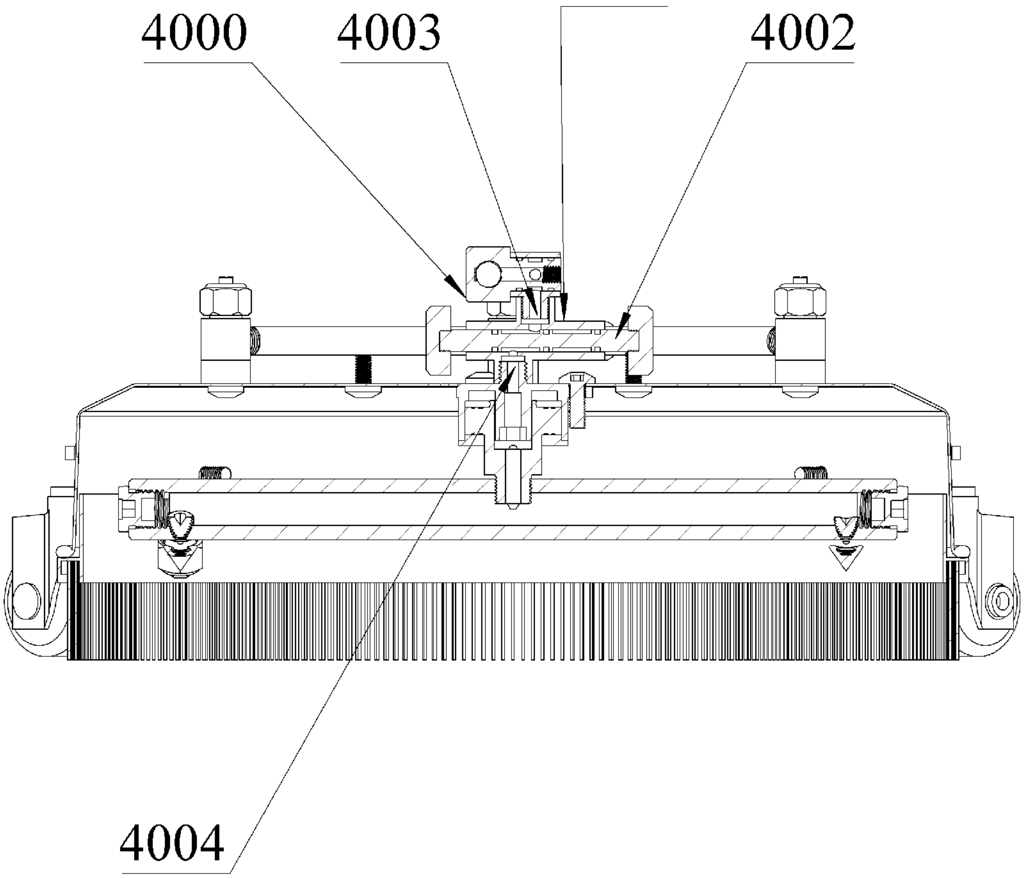
FIG. 6 is a schematic sectional view of the valve component.

In this embodiment, as shown in FIG. 6, the valve component 4000 includes a valve body 4001 and a piston device 4002, wherein the valve body 4001 includes a water inlet end 4003 and a water outlet ends 4004, and the piston device 4002 is movably installed in the valve body 4001, and the water flow is precisely controlled by operating the piston device 4002 to control the water outlet end 4004, so as to better meet its requirements.

Figure 7:
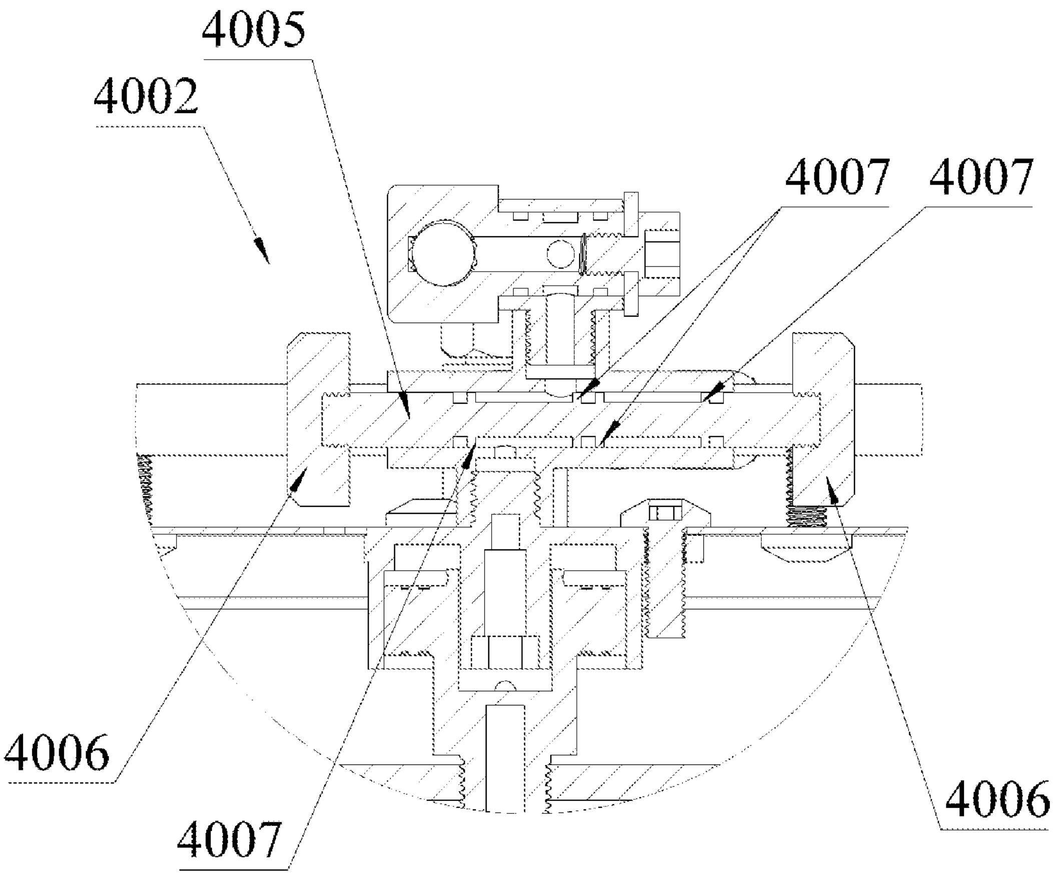
FIG. 7 is a schematic sectional view of the piston device.

In this embodiment, as shown in FIG. 7, the piston device 4002 includes a pin rod 4005 and bolt caps 4006 connected to both ends of the pin rod 4005, wherein the diameter of the middle part of the pin rod 4005 is smaller than that of both ends, and four sealing rings 4007 are also arranged on the middle part of the pin rod 4005, wherein the distance between the two sealing rings 4007 in the middle is the same as the size of the water outlet of the water inlet end 4003, which can prevent liquid leakage during spraying operation.

In other embodiments (not shown in the figure), the valve body 4001 can be provided with a water inlet end 4003 and a water outlet ends 4004, or the water inlet end 4003 and the water outlet end 4004 can be configured in any other desired number, so as to improve the working efficiency of the spraying device.

In other embodiments (not shown in the figure), the valve component 4001 can also include a sensor, which is used to detect the water flow and send the detected water flow information to a controller, and the controller controls the movement of the piston device according to the received water flow information, thus automatically adjusting the water flow. The valve component 4001 can be controlled not only manually, but also automatically, making it more convenient to use and more powerful. In other embodiments (not shown in the figure), a wireless communication module is added to the valve component 4001, and the user can remotely control the opening and closing of the valve and the size of the water flow through the mobile phone or other intelligent devices, which makes the operation more convenient and more intelligent. In other embodiments (not shown in the figure), the multi-directional spraying device 100 is also provided with a camera.

Figure 8:
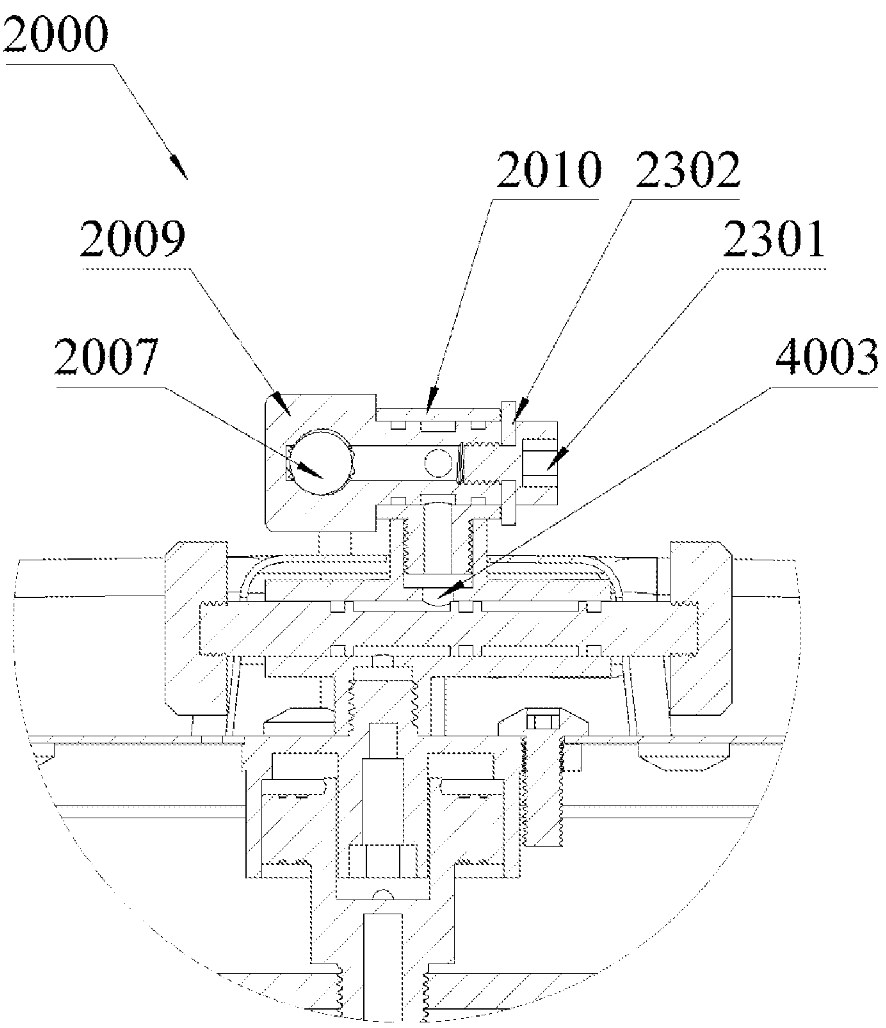
FIG. 8 is a schematic view of the sectional structure of the adapter.

In this embodiment, as shown in FIG. 8, the spraying component 2000 further includes an adapter 2009, wherein the adapter 2009 is also provided with a connecting member 2010, wherein an internal thread is arranged in the connecting member 2010, and the connecting member 2010 and the adapter 2009 are fixedly connected through a bolt 2301, and a gasket 2302 is also arranged between the connecting member 2010 and the bolt 2301. Not only can the adapter 2009 and the connecting member 2010 be connected more firmly, but also the abrasion caused by direct contact can be prevented, and the service life of the spraying component is prolonged. The adapter 2009 has a rotation range of 360 degrees, which can realize the spraying operation of the spraying component 2000 in a larger range and provide greater flexibility. The water outlet connector 2007 and the adapter 2009 are detachably attached to the water inlet end 4003 through thread fitting, which is convenient for subsequent replacement or maintenance.

In another embodiment (not shown), the adapter 2009 may include a locking mechanism, which can lock the adapter 2009 at a specific rotation angle. In this way, even under the pressure of water flow, the direction of the water outlet connector 2007 can be kept stable.

Figure 9:
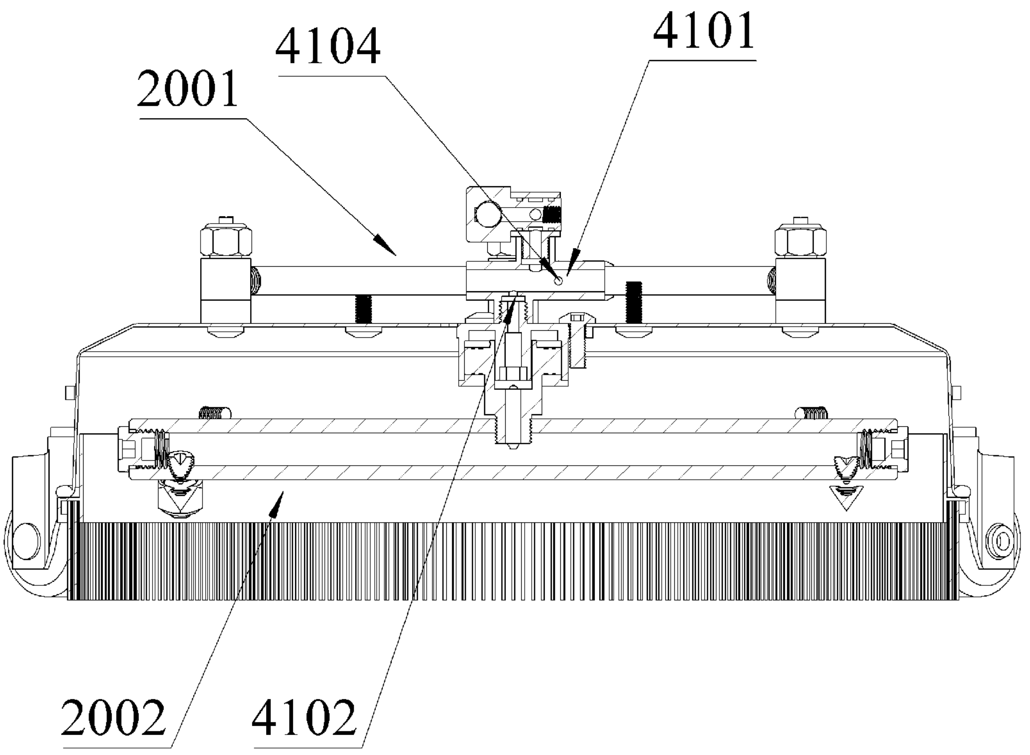
FIG. 9 is a schematic sectional view of the water outlet end.

In this embodiment, as shown in FIG. 9, the water outlet end 4004 includes a first water outlet port 4101 and a second water outlet port 4102, wherein the first water outlet port 4101 is detachably attached to the first spraying mechanism 2001 and the second water outlet port 4102 is detachably attached to the second spraying mechanism 2002, wherein the center of the first water outlet port 4101 is provided with a water hole 4104. The diameter of the water hole 4104 is smaller than that of the first water outlet port 4101, so as to control the flow of water. The first water outlet port 4101 defines the first axis of water flowing out through the first water outlet port 4101, and the second water outlet port 4102 defines the second axis of water flowing out through the second water outlet port 4102. The first axis is transverse to the second axis. By setting two water outlet ports, two water outlet ports can be controlled independently, so as to control the water spraying direction. In other embodiments (not shown in the figure), the angle between the first axis and the second axis can also be set at 90-180 degrees to realize multi-directional spraying operation.

Figure 10:
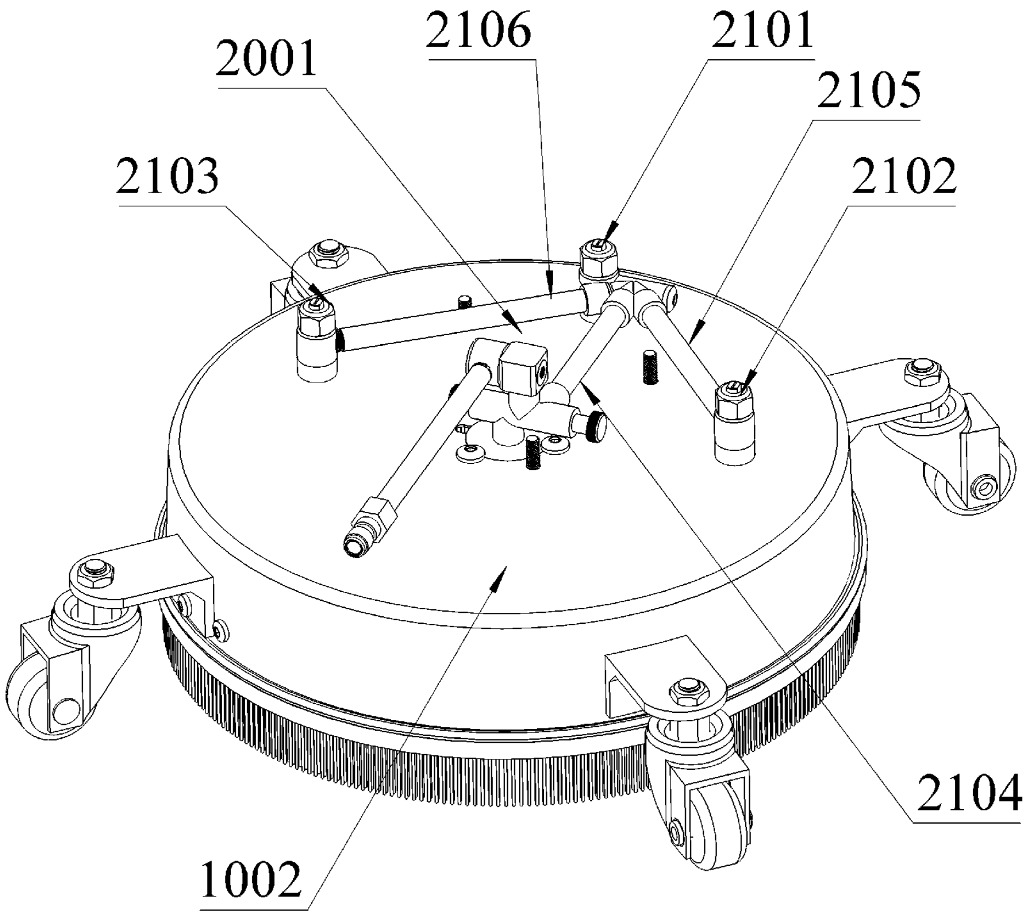
FIG. 10 is a schematic structural view of the first spraying mechanism.

In this embodiment, as shown in FIG. 10, the first spraying mechanism 2001 includes a first nozzle 2101, a second nozzle 2102 and a third nozzle 2103, which are uniformly distributed on the first wall 1002, wherein the connections among the first nozzle 2101, the second nozzle 2102 and the third nozzle 2103 form a roughly triangular shape, wherein the first nozzle 2101, the second nozzle 2102 and the third nozzle 2103 are all made of metal materials. In other embodiments (not shown in the figure), the first spraying mechanism 2001 can be provided with four nozzles, wherein the four nozzles can be connected to form a roughly circular or quadrangular shape, thereby providing a larger spraying range and improving the working efficiency of the spraying device. In other embodiments (not shown), the nozzles on the first spraying mechanism 2001 can be configured in any other desired number.

In this embodiment, the first spraying mechanism 2001 also includes a first water pipe 2104, a second water pipe 2105 and a third water pipe 2106. The first water outlet port 4101 is in threaded engagement with the first water pipe 2104 so as to communicate with the first nozzle 2101, the second nozzle 2102 and the second water pipe 2105 communicate with the first nozzle 2101 through screw fitting, and the third nozzle 2103 and the third water pipe 2106 communicate with the first nozzle 2101 through screw fitting.

In this embodiment, the first water pipe 2104, the second water pipe 2105 and the third water pipe 2106 are made of metal materials. In other embodiments (not shown in the figure), the first water pipe 2104, the second water pipe 2105 and the third water pipe 2106 are made of stainless steel materials, which have high corrosion resistance, smooth surfaces and are easy to clean.

Figure 11:
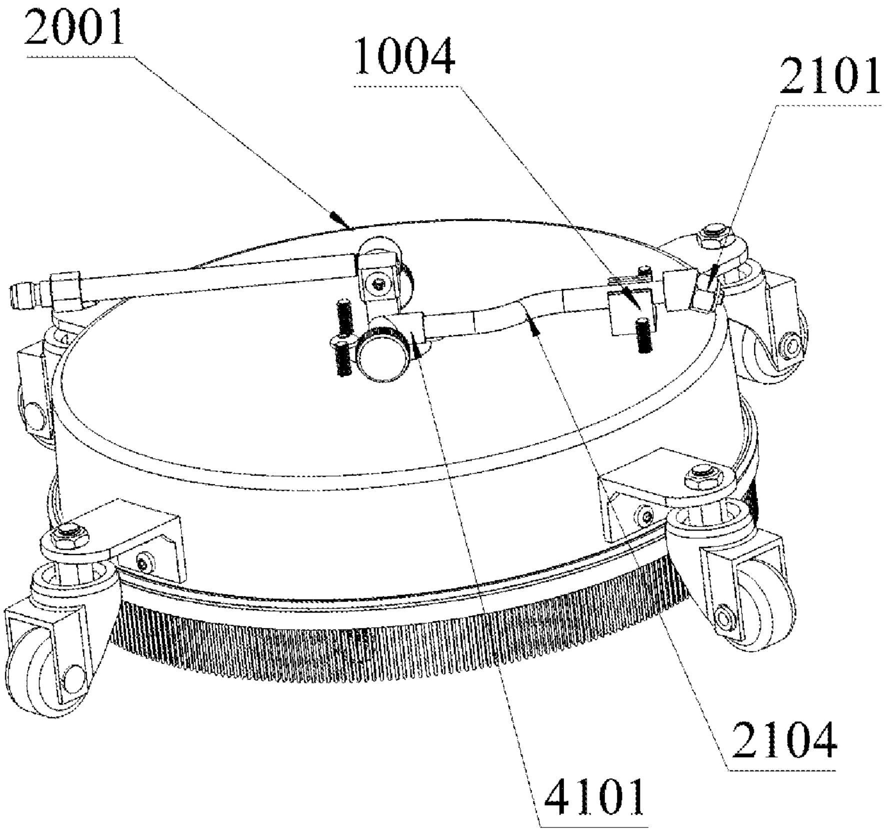
FIGS. 11-12 are schematic structural views of the first spraying mechanism in another embodiment.

In another embodiment, as shown in FIG. 11, the first spraying mechanism 2001 of the lateral spraying device 100 includes a first nozzle 2101 and a first water pipe 2104. The first water outlet port 4101 communicates with the first nozzle 2101 through the first water pipe 2104, and the fixing seat 1004 receives and fixes the first water pipe 2104, wherein the spraying direction of the first nozzle 2101 faces the side of the spraying device and can be used for cleaning external walls or corners.

Figure 12:
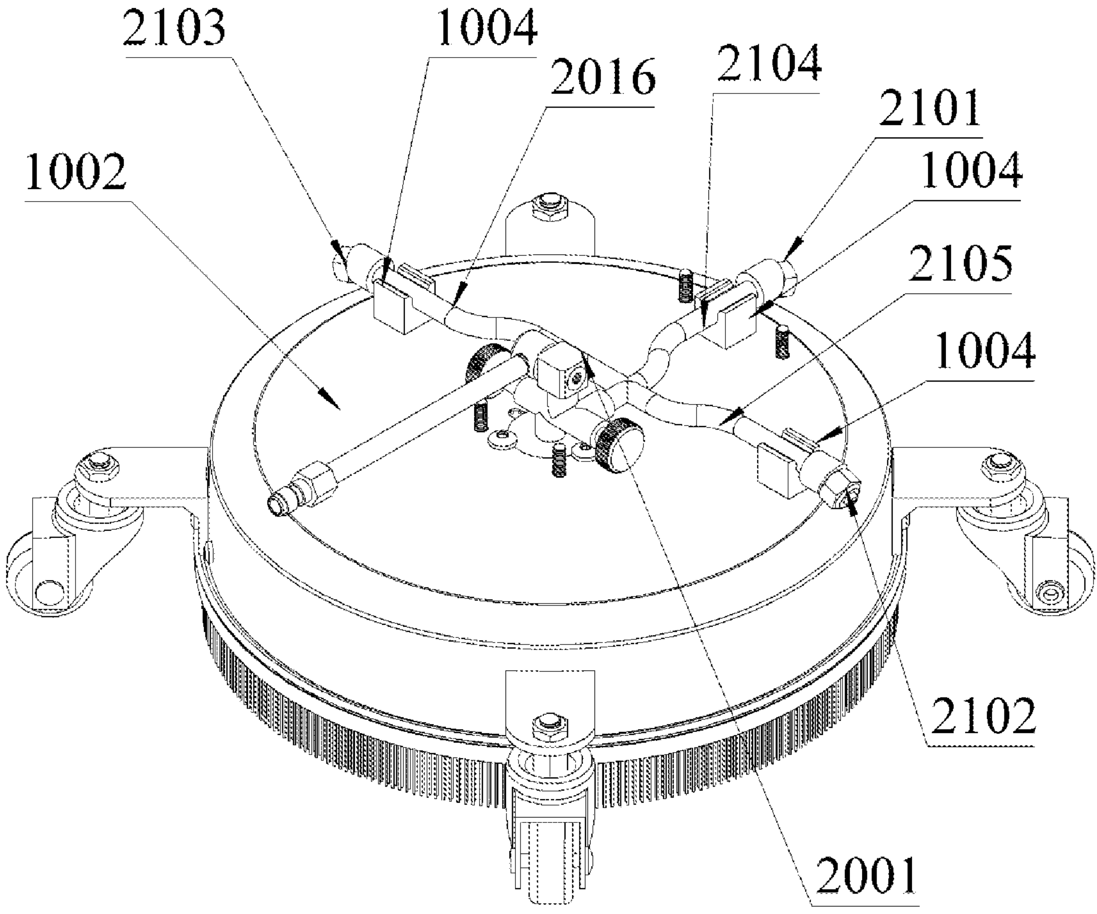

In other embodiments, as shown in FIG. 12, the first spraying mechanism 2001 includes a first nozzle 2101, a second nozzle 2102 and a third nozzle 2103, as well as a first water pipe 2104, a second water pipe 2105 and a third water pipe 2106, wherein the first nozzle 2101 and the first water pipe 2104 are in communication through screw fitting, and the second nozzle 2102 and the second water pipe 2105 are in communication through screw fitting, and the third nozzle 2103 and the third water pipe 2106 are communicated through screw fitting; the first water pipe 2104, the second water pipe 2105 and the third water pipe 2106 are fixed on the first wall 1002 through the fixing seat 1004, so that the stability during spraying operation can be ensured, and the nozzle can be prevented from loosening due to excessive water pressure. By increasing the number of nozzles, a wider spraying range and more flexible spraying operation can be provided.

In another embodiment (not shown in the figure), the first water pipe 2104 is welded to the first water outlet port 4101 so as to communicate with the first nozzle 2101, the second nozzle 2102 is welded to the second water pipe 2105 so as to communicate with the first nozzle 2101, and the third nozzle 2103 is welded to the third water pipe 2106 so as to communicate with the first nozzle 2101. Through welding, the water pipes and nozzles are connected, which has firm characteristics and will not be loose in spraying operation.

Figure 13:
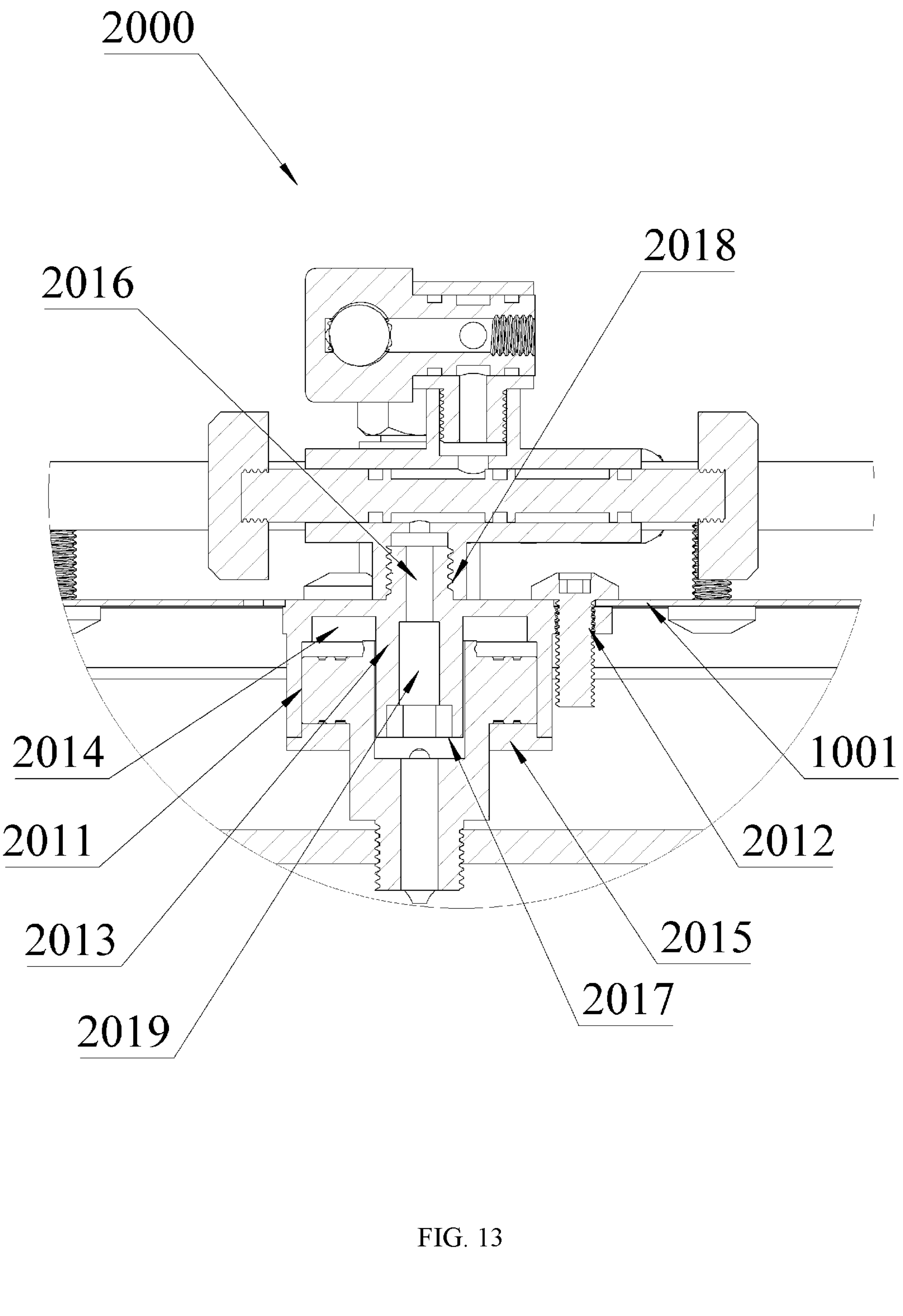
FIG. 13 is a schematic view of the sectional structure of the fixing member.

In this embodiment, as shown in FIG. 13, the spraying component 2000 further includes a fixing member 2011, which includes a fixing hole 2012, a connecting part 2013 and a cavity 2014, wherein the fixing member 2011 is fixedly connected with the supporting end 1001 through bolts, and the bottom of the fixing member 2011 is provided with a detachable fixing cover 2015. The connecting part 2013 includes a first connecting end 2016 and a second connecting end 2017, the first connecting end 2016 is provided with a first external thread 2018, and the second connecting end 2017 has a substantially cylindrical outer wall surface, wherein the connecting part 2013 also includes a water flow passage 2019 penetrating through the first connecting end 2016 and the second connecting end 2017, wherein the flow diameter of the water flow passage 2019 gradually increases from top to bottom, Moreover, the lower end of the water flow passage 2019 has a hexagonal column structure. By increasing the flow diameter of the water flow passage 2019, the water flow rate can be increased, thereby improving the spraying efficiency of the spraying device, wherein the cavity 2014 has a substantially cylindrical inner wall surface.

In other embodiments (not shown in the figure), the water flow passage 2019 has a cylindrical structure with uniform flow diameters. In other embodiments (not shown in the figure), the flow diameter of the water flow passage 2019 gradually increases from top to bottom, and the lower end of the water flow passage 2019 has an octagonal column structure.

Figure 14:
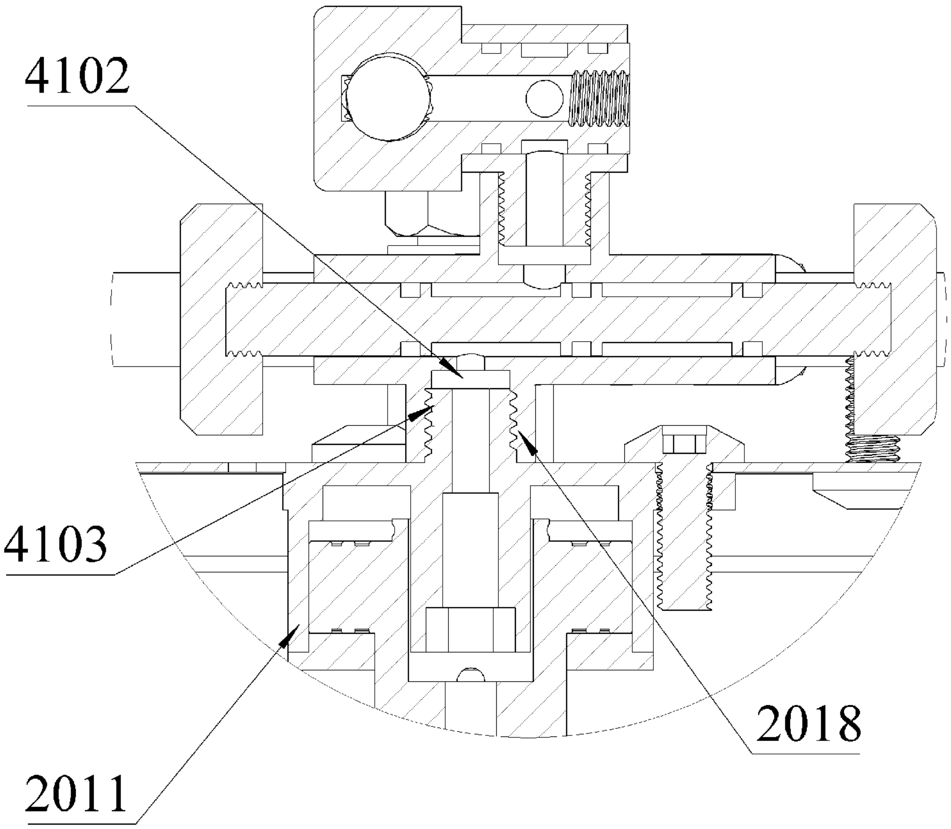
FIG. 14 is a schematic structural view of the connection section of the second water outlet port.

In this embodiment, as shown in FIG. 14, the second water outlet port 4102 is provided with a first internal thread 4103, and the second water outlet port 4102 is detachably attached to the fixing member 2011 through the thread matching of the first internal thread 4103 and the first external thread 2018.

In other embodiments (not shown in the figure), the connecting part 2013 is provided with a buckle, and the second water outlet port 4102 is internally provided with a slot, and the second water outlet port 4102 is detachably attached to the fixing member 2011 by being engaged with the slot through the buckle.

Figure 15:
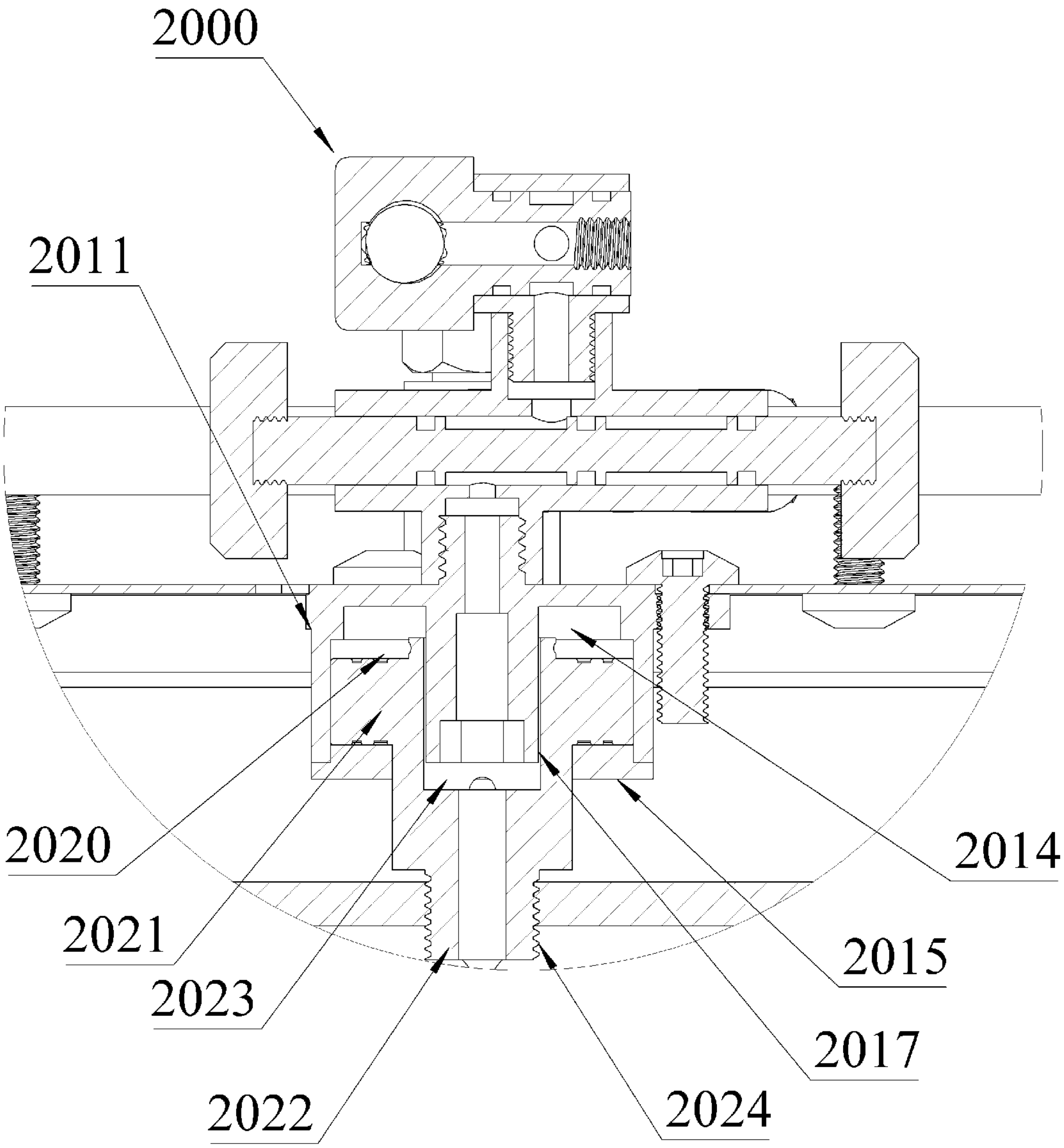
FIG. 15 is a schematic cross-sectional view of the rotating part.

In this embodiment, as shown in FIG. 15, the spraying component 2000 further includes a rotating member 2020, wherein the rotating member 2020 includes a rotating part 2021, a communicating part 2022 and a through groove 2023, wherein the through groove 2023 penetrates through the rotating part 2021 and the communicating part 2022, and the through groove 2023 has a substantially cylindrical inner wall surface, wherein the communicating part 2022 is provided with a second external thread 2024.

In this embodiment, the rotating part 2021 is arranged in the cavity 2014 and fixed by the fixing cover 2015, and the second connecting end 2017 is arranged in the through groove 2023, wherein the outer diameter of the second connecting end 2017 is not greater than the inner diameter of the through groove 2023, and the rotating member 2020 forms a rotating connection with the fixing member 2011. Setting the rotating part 2021 in the cavity 2014 and fixing it by the fixing cover 2015 can provide stable rotation, thus reducing the friction caused by rotation and improving the stability of the equipment.

In this embodiment, the rotating part 2021 is a bearing, in which the upper and lower surfaces of the bearing are respectively provided with two tracks, and the track on the lower surface is fixed in the cavity 2014 in contact with the upper surface of the fixing cover 2015, the fixing cover 2015 has a smooth upper surface, thereby reducing the rotating friction and realizing stable high-speed rotation, thus improving the working efficiency of the spraying device. At the same time, the bearing has the characteristics of easy installation and replacement, and can reduce the maintenance cost and time.

Figure 16:
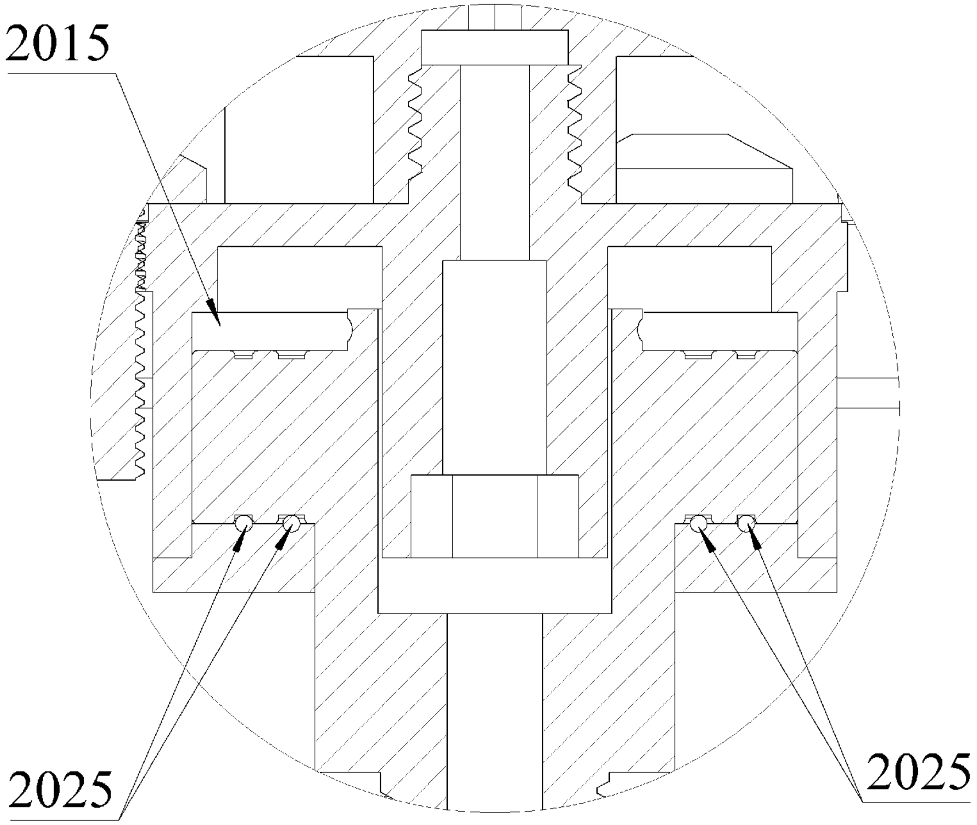
FIG. 16 is a schematic view of the rotating section structure of the rotating part in another embodiment.

In other embodiments, as shown in FIG. 16, a plurality of balls 2025 are arranged in the track of the lower surface of the bearing. By contacting the balls 2025 with the upper surface of the fixing cover 2015, the rotation friction of the bearing can be reduced, and the higher-speed and stable rotation can be realized, thus improving the working efficiency of the spraying device.

Figure 17:
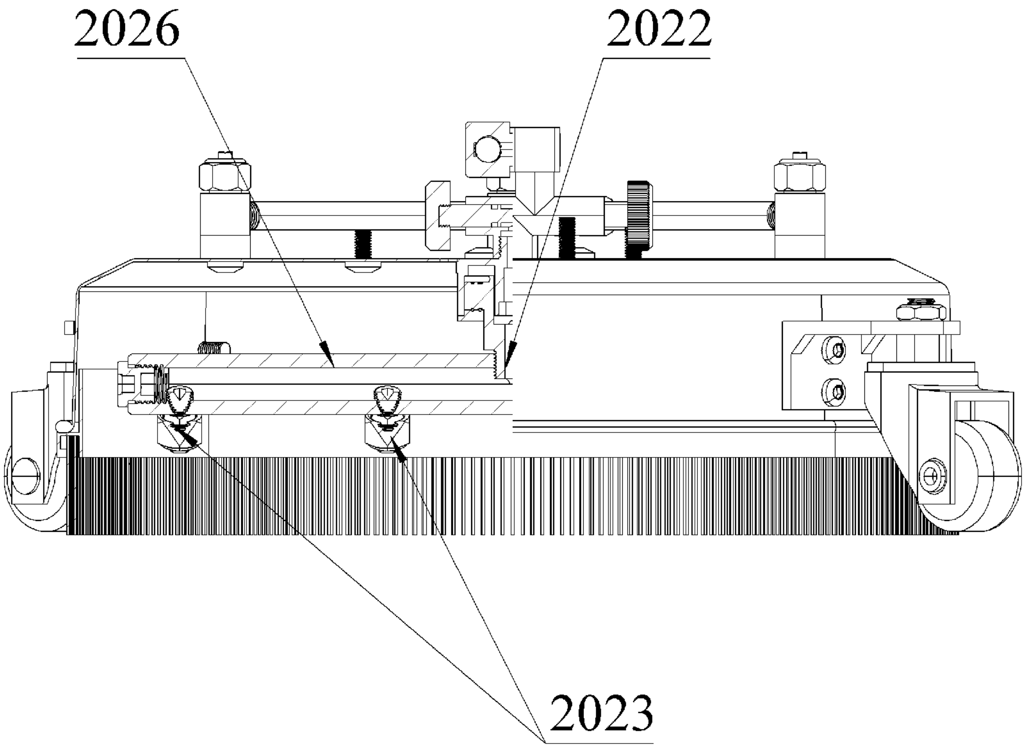
FIG. 17 is a schematic sectional view of the second spraying mechanism in another embodiment.

In other embodiments, as shown in FIG. 17, the second spraying mechanism 2002 includes a water pipe 2026, one end of which is detachably connected with the communication part 2022 through a threaded connection, and the other end is provided with two nozzles 2003, wherein the water jet direction of the nozzles 2003 has an angle of 0 to 90 degrees with the horizontal plane, so that the spraying device provides a wide spraying range.

In other embodiments (not shown in the figure), one end of the water pipe 2026 is provided with a slot, and the communicating part 2022 is provided with a buckle, so that the water pipe 2026 and the communicating part 2022 can be detachably connected through the buckle and slot. In other embodiments (not shown), the other end of the water pipe 2026 is provided with two nozzles 2003 or any other desired number.

Figure 18:
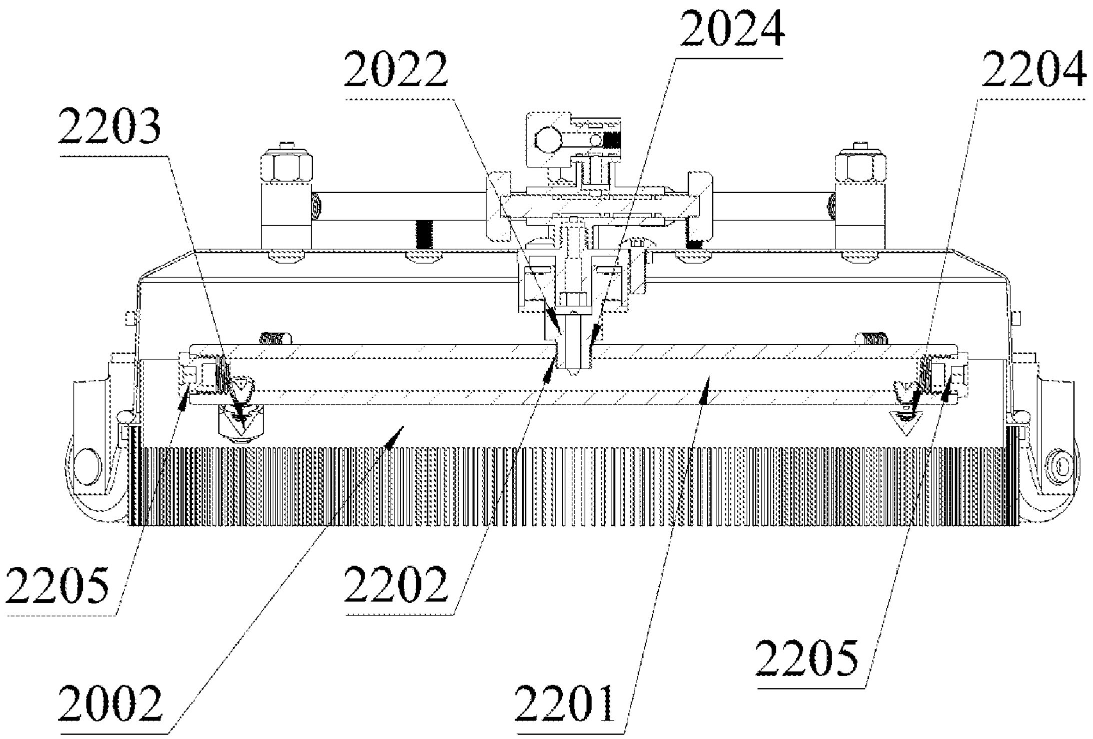
FIG. 18 is a schematic sectional view of the second spraying mechanism in this embodiment.

In this embodiment, as shown in FIG. 18, the second spraying mechanism 2002 includes a fourth water pipe 2201, the middle of which is provided with a second internal thread 2202, and the fourth water pipe 2201 and the communicating part 2022 are detachably connected by matching of the second internal thread 2202 and the second external thread 2024, and the fourth water pipe 2201 is provided with a fourth nozzle 2203 and a fifth nozzle 2204 at both ends, wherein the fourth nozzle 2203 is arranged obliquely downwards and forwards, and the fifth nozzle 2204 is arranged obliquely downwards and backwards, and the water jet directions of both the fourth nozzle 2203 and the fifth nozzle 2204 have an angle of 0 to 90 degrees with the horizontal plane. When water is jetted from the fourth nozzle 2203 and the fifth nozzle 2204, the rotating part 2021 rotates under the action of water pressure, thereby driving the whole spraying device to rotate, and realizing the function of multi-directional water spraying.

In this embodiment, the fourth nozzle 2203 and the fifth nozzle 2204 are both made of metal materials, and the fourth water pipe 2201 is made of stainless steel, which has strong corrosion resistance, smooth surface and easy cleaning.

In this embodiment, the two ends of the fourth water pipe 2201 are respectively provided with sealing members 2205, wherein the two ends of the fourth water pipe 2201 are provided with internal threads, and the sealing members 2205 are provided with external threads. The sealing members 2205 and the fourth water pipe 2201 are connected and fixed through the matching of the internal threads and the external threads, so that the fourth water pipe 2201 forms a sealed channel to avoid water leakage during use, thereby effectively improving the working efficiency of the spraying device.

In other embodiments (not shown in the figure), the middle part of the fourth water pipe 2201 is provided with a slot, and the communicating part 2022 is provided with a buckle, so that the fourth water pipe 2201 and the communicating part 2022 are detachably connected through the cooperation of the buckle and the slot.

Figure 19:
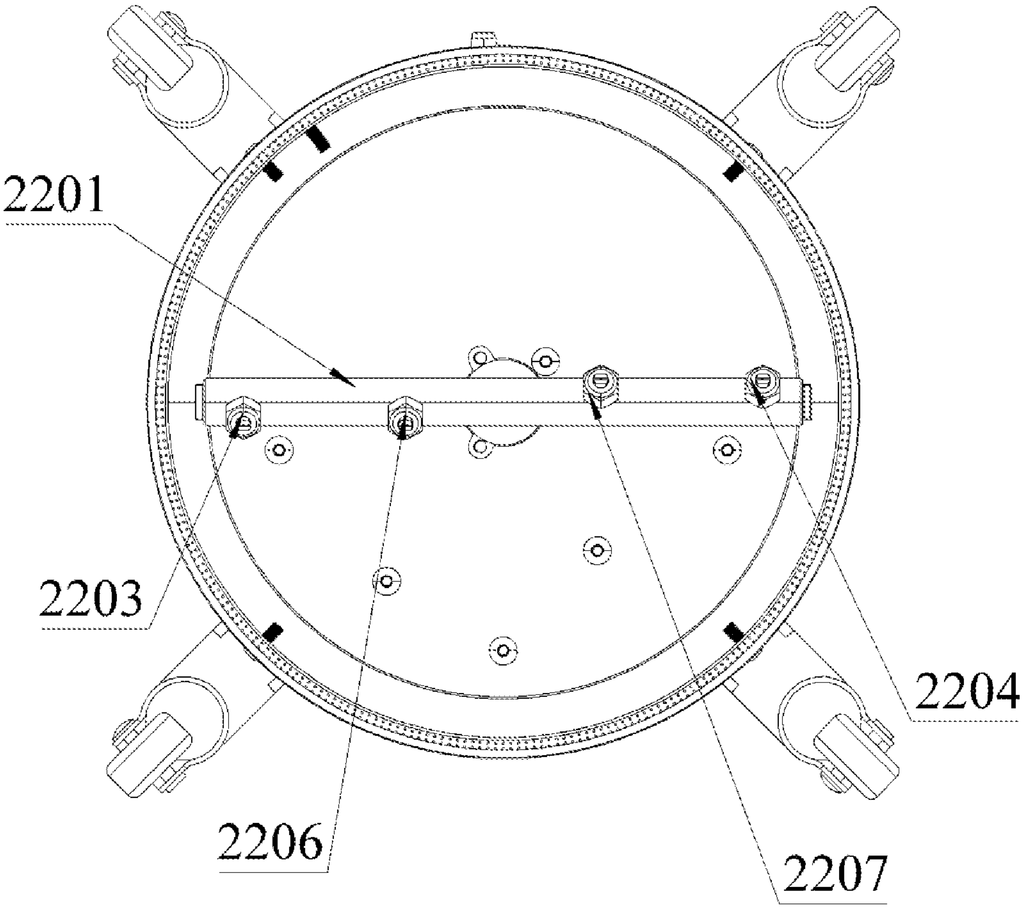
FIG. 19 is a schematic structural view of the nozzle on the fourth water pipe in another embodiment.

In other embodiments, as shown in FIG. 19, a fourth nozzle 2203, a fifth nozzle 2204, a sixth nozzle 2206 and a seventh nozzle 2207 are uniformly arranged on the fourth water pipe 2201, wherein the water jet directions of the fourth nozzle 2203, the fifth nozzle 2204, the sixth nozzle 2206 and the seventh nozzle 2207 are all arranged at an angle of 0 to 90 degrees from the horizontal plane, and the water jet directions of the fourth nozzle 2203 and the sixth nozzle 2206 are opposite to those of the fifth nozzle 2204 and the seventh nozzle 2207. In other embodiments (not shown), the nozzles on the fourth water pipe 2201 can be arranged in any other desired number.

Figure 20:
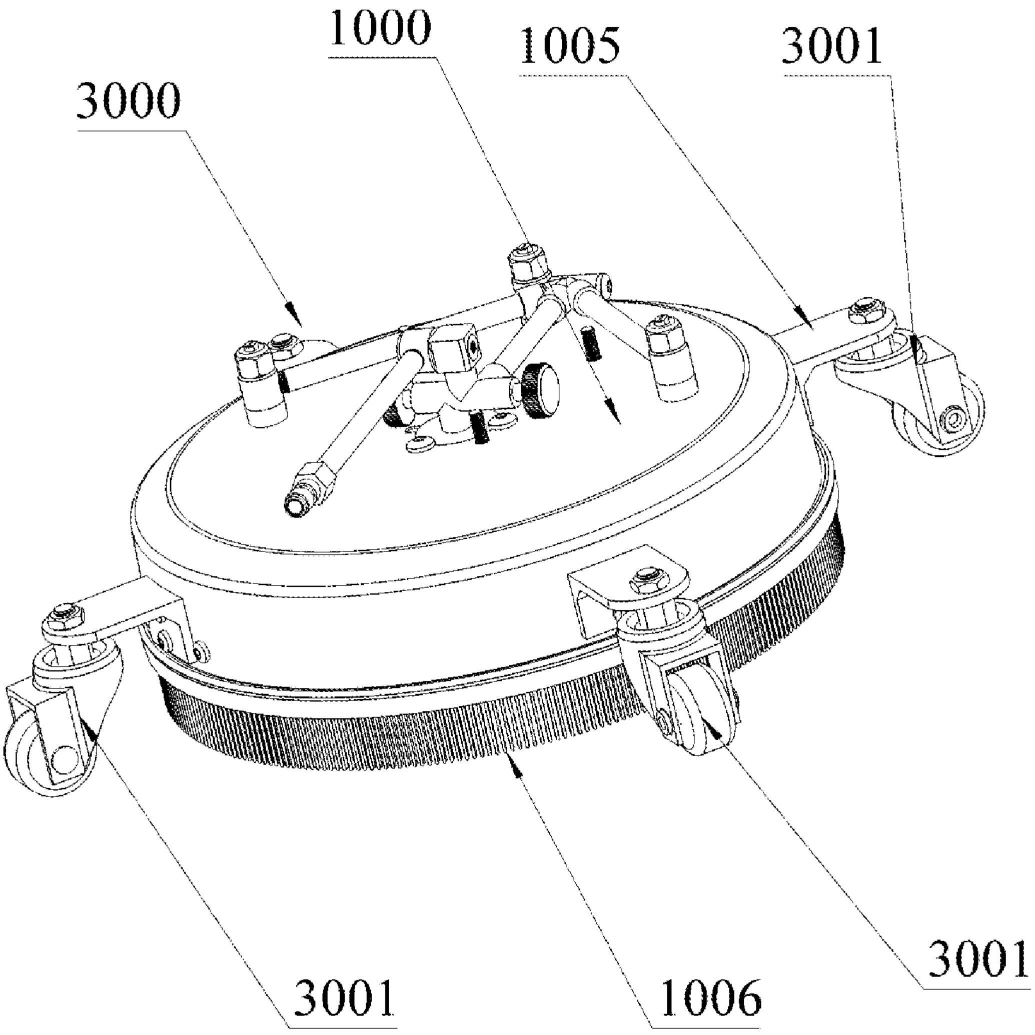
FIG. 20 is a structural schematic diagram of the moving component.

In this embodiment, as shown in FIG. 20, the moving component 3000 includes four moving wheels 3001, and the four moving wheels 3001 are fixedly connected with the frame component 1000 through a connecting frame 1005, wherein one end of the connecting frame 1005 is connected with the frame component 1000 through a bolt connection, and the other end is fixedly connected with the moving wheels 3001 through a bolt connection, so that the connecting lines among the four moving wheels 3001 form a roughly rectangular structure, which makes the spraying device more stable when moving.

In other embodiments (not shown in the figure), the moving component 3000 includes at least three moving wheels 3001, and the three moving wheels 3001 are fixedly connected with the frame component 1000 through a connecting frame 1005, wherein the connecting frame 1005 is respectively fixed with the moving wheel 3001 and the frame component 1000 through bolt connection, and the connecting lines among the three moving wheels 3001 form a roughly triangular structure.

In this embodiment, the frame component 1000 is also provided with bristles 1006, which are continuously formed around the outer periphery of the frame component 1000, so that the ground can be effectively cleaned by the bristles 1006, and a good cleaning effect can be maintained no matter whether the frame component 1000 travels in a straight line or turns, wherein the bottom surface of the bristles 1006 is not higher than the bottom surface of the moving wheel 3001, and the bristles 1006 will contact with the ground when the spraying device moves. At the same time, it can adapt to various terrain and surface conditions to achieve better cleaning effect, and the bristles can prevent dust and debris from entering the spraying device and damaging its internal components.

Figure 21:
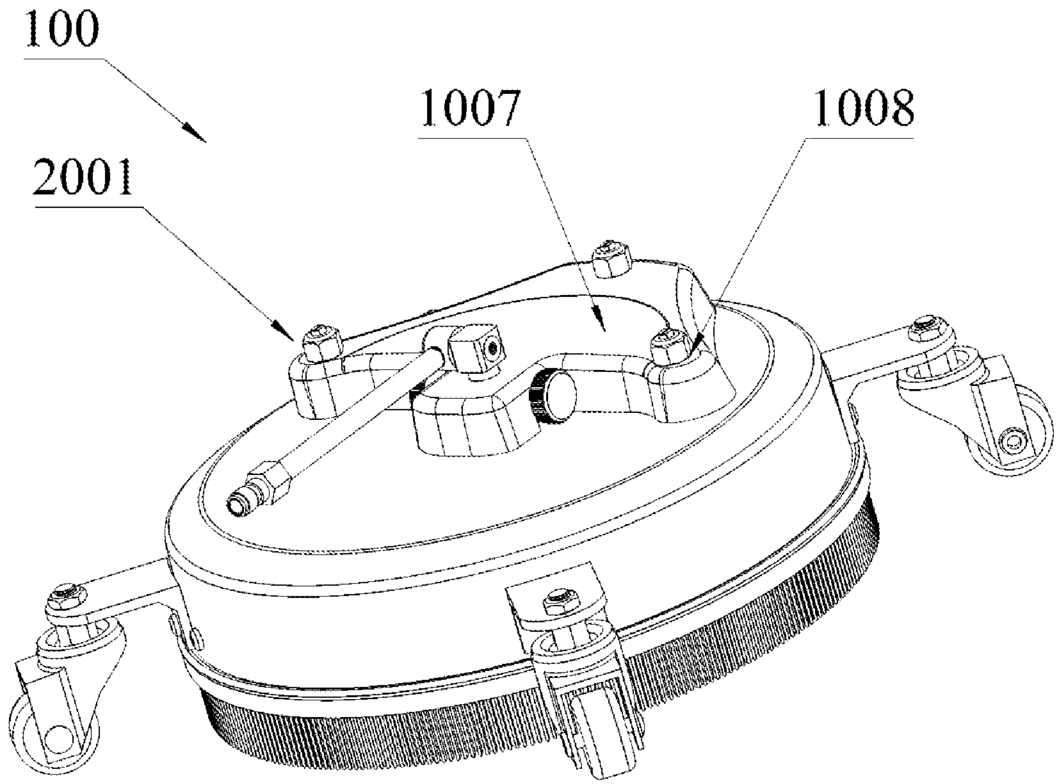
FIG. 21 is a schematic diagram of the overall structure of the multidirectional spraying device.

In this embodiment, as shown in FIG. 21, the multi-directional spraying device 100 further includes a casing 1007, which covers the first spraying mechanism 2001, and is also provided with a through hole 1008 through which the nozzle 2003 on the first spraying mechanism 2001 can pass, wherein the casing 1007 forms a barrier to the first spraying mechanism, which can protect the spraying mechanism from the external environment, such as dust prevention, water prevention, collision prevention, etc., and it is easy to maintain and clean, and at the same time, it can make the whole device more beautiful.

In this embodiment, the frame component 1000 is made of aluminum alloy, which has the characteristics of corrosion resistance, lightness and durability. In other embodiments (not shown), the frame component 1000 can be made of plastic, which has the characteristics of low cost and portability.

The present invention also discloses a use method of the multi-directional spraying device 100, which includes providing the multi-directional spraying device 100, wherein the multi-directional spraying device 100 includes a frame component 1000, a spraying component 2000 and a moving component 3000.

In this embodiment, the frame component 1000 includes a supporting end 1001, which includes a first wall 1002 and a second wall 1003 opposite to the first wall 1002, wherein there is a thickness dimension between the first wall 1002 and the second wall 1003, and the spraying component 2000 is detachably attached to the supporting end 1001, including a first spraying mechanism 2001 and a second spraying mechanism 2002. Both the first spraying mechanism 2001 and the second spraying mechanism 2002 are provided with at least one movable nozzle 2003, wherein the spraying component 2000 further includes a valve component 4000 communicating with the first spraying mechanism 2001 and the second spraying mechanism 2002, and a water flow channel communicating with a plurality of nozzles 2003, wherein the first spraying mechanism 2001 is arranged on the first wall 1002, and the second spraying machine 2002 is arranged on the first wall.

The method includes: connecting the multi-directional spraying device 100 with an external water source;

- moving the multi-directional spraying device 100 to the site where spraying
- operation is required;
- adjusting the valve component 4000 to enable the spraying component 2000 to perform spray operation, wherein the valve component 4000 can control the spraying operations of the first spraying mechanism 2001 and the second spraying mechanism 2002; turning off the external water source after spraying operation is completed;
- recycling and cleaning the multi-directional spraying device 100.

In this embodiment, when the first spraying mechanism 2001 needs to be used alone for spraying operation, the valve component 4000 is used to close the water inlet of the second spraying mechanism 2002; when the second spraying mechanism 2002 needs to be used alone for spraying operation, the valve component 4000 is used to close the water inlet of the first spraying mechanism; when it is necessary for the first spraying mechanism 2001 and the second spraying mechanism 2002 to operate at the same time, the valve component 4000 is adjusted to a completely operating state.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A multi-directional spraying device, the device comprising:

- a frame component, a spraying component and a moving component; and wherein, the frame component comprises a supporting end, and the supporting end comprises a first wall and a second wall opposite to the first wall, wherein there is a thickness dimension between the first wall and the second wall; and wherein, the spraying component is detachably attached to the supporting end and comprises a first spraying mechanism and a second spraying mechanism, wherein at least one movable nozzle is arranged on both the first spraying mechanism and the second spraying mechanism; wherein the spraying component further comprises a valve component communicating with the first spraying mechanism and the second spraying mechanism, and a water flow channel communicating with a plurality of nozzles;

wherein, the first spraying mechanism is arranged on the first wall, the second spraying mechanism is arranged on the second wall;

wherein, the moving component forms a fixed connection with the frame component to support and move the frame component;

wherein the valve component comprises a valve body and a piston device, the valve body comprises at least one water inlet end and at least one water outlet end, the piston device is movably arranged across the valve body, and the multi-directional spraying device controls water output of the at least one water outlet end through the movement of the piston device, the at least one water outlet end comprises a first water outlet port and a second water outlet port, the first water outlet port is detachably attached to the first spraying mechanism, the second water outlet port is detachably attached to the second spraying mechanism, the first water outlet port defines a first axis through which water flows out via the first water outlet port, and the second water outlet port defines a second axis through which water flows out via the second water outlet port, and the first axis is transverse to the second axis, and the spraying component further comprises a rotating member, which comprises a rotating part, a communicating part and a through groove, the through groove penetrates the rotating part and the communicating part, and the through groove has a substantially cylindrical inner wall surface, and the communicating part is provided with a second external thread.

2. The multi-directional spraying device according to claim 1, wherein the spraying component further comprises a water supply device detachably attached to the valve component, wherein the water supply device comprises a water supply pipeline, a water inlet connector and a water outlet connector, and the water inlet connector is communicated with an external water source.

3. The multi-directional spraying device according to claim 2, wherein the spraying component further comprises an adapter, wherein the adapter has a rotation range of 360 degrees, and the water outlet connector is detachably attached to the water inlet end through the adapter.

4. The multi-directional spraying device according to claim 1, wherein the first spraying mechanism comprises a first nozzle, a second nozzle and a third nozzle, wherein the first nozzle, the second nozzle and the third nozzle are uniformly distributed on the first wall, a connection among the first nozzle, the second nozzle and the third nozzle forms a triangle.

5. The multi-directional spraying device according to claim 4, wherein the first spraying mechanism also comprises a first water pipe, a second water pipe and a third water pipe, wherein the first water outlet port is communicated with the first nozzle through the first water pipe, the second nozzle is communicated with the first nozzle through the second water pipe, and the third nozzle is communicated with the first nozzle through the third water pipe.

6. The multi-directional spraying device according to claim 1, wherein the spraying component further comprises a fixing member, which comprises a fixing hole, a connecting part and a cavity, wherein the fixing member is fixedly connected with the supporting end through the fixing hole, wherein the connecting part comprises a first connecting end and a second connecting end, the first connecting end is provided with a first external thread, and the second connecting end has a substantially cylindrical outer wall surface; and wherein, the connecting part further comprises a water flow path penetrating through the first connecting end and the second connecting end, wherein the cavity has a substantially cylindrical inner wall surface.

7. The multi-directional spraying device according to claim 6, wherein the second water outlet port is provided with a first internal thread, and the second water outlet port is detachably attached to the fixing member through thread matching of the first internal thread and the first external thread.

8. The multi-directional spraying device according to claim 6, wherein the rotating part is arranged in the cavity, and the second connecting end is arranged in the through groove, wherein an outer diameter of the second connecting end is not greater than an inner diameter of the through groove, and the rotating member and the fixing member form a rotating connection.

9. The multi-directional spraying device according to claim 8, wherein the second spraying mechanism comprises at least one water pipe, one end of which is detachably connected with the communication part, and the other end of which is provided with at least one second spraying mechanism nozzle, wherein a water jet direction of the at least one second spraying mechanism nozzle has an angle of 0 to 90 degrees with a horizontal plane.

10. The multi-directional spraying device according to claim 9, wherein the second spraying mechanism comprises a fourth water pipe, a middle part of which is detachably connected with the communication part, and ends of the fourth water pipe are provided with a fourth nozzle and a fifth nozzle, wherein the water jet directions of the fourth nozzle and the fifth nozzle both have an angle of 0 to 90 degrees with the horizontal plane.

* * * * *